Figure 33:
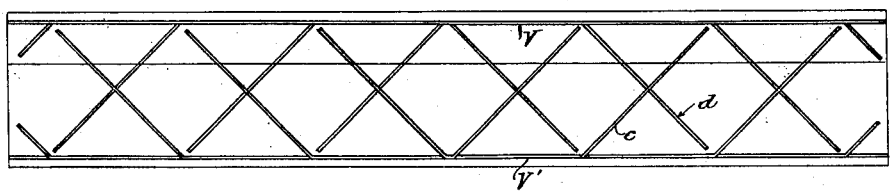

No. 736,602. PATENTED AUG. 18, 1903.
J. KAHN.
CONCRETE AND METAL CONSTRUCTION.
APPLICATION FILED DEC. 11, 1902.
NO MODEL. 4 SHEETS—SHEET 1.
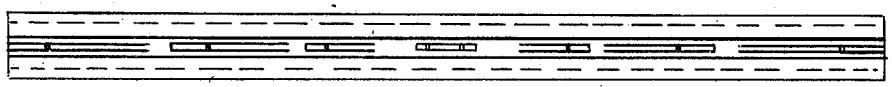
Fig. 1
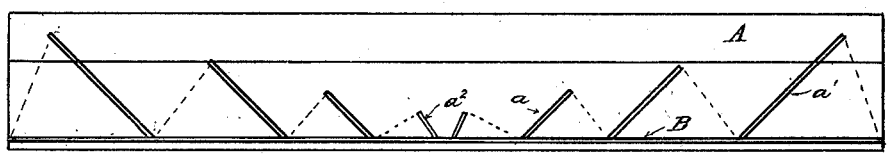 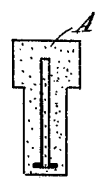
Fig. 2  Fig. 3
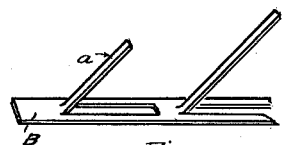
Fig. 4
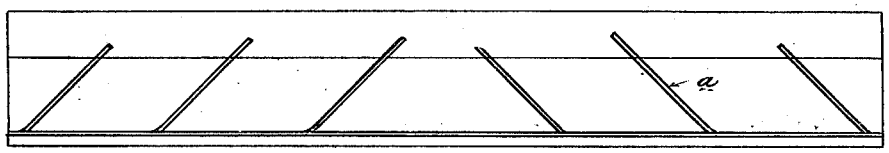
Fig. 5
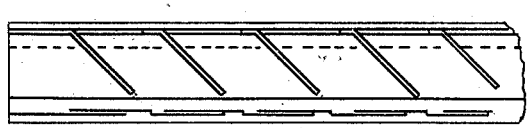 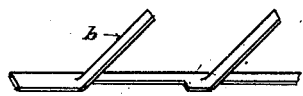
Fig. 6  Fig. 8
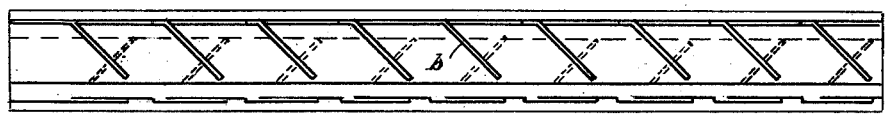 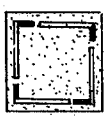
Fig. 7  Fig. 9
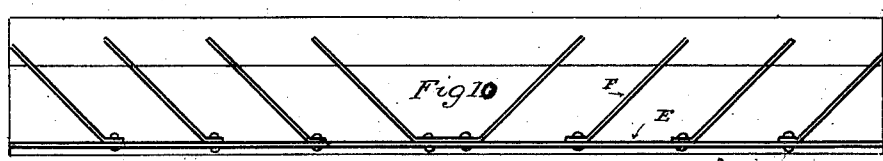 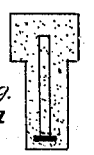
Fig. 10  Fig. 11
WITNESSES. INVENTOR.
Julius Kahn
By Attorneys.

No. 736,602. PATENTED AUG. 18, 1903.
J. KAHN.
CONCRETE AND METAL CONSTRUCTION.
APPLICATION FILED DEC. 11, 1902.
NO MODEL. 4 SHEETS—SHEET 2.
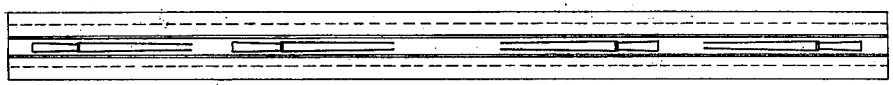
Fig. 12
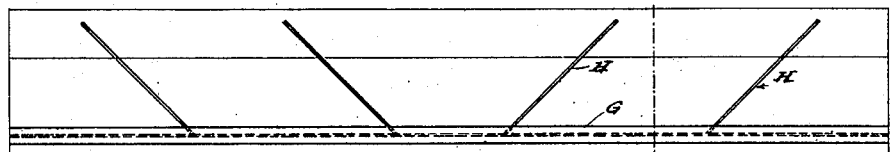 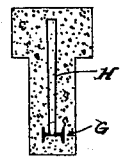
Fig. 13   Fig. 14
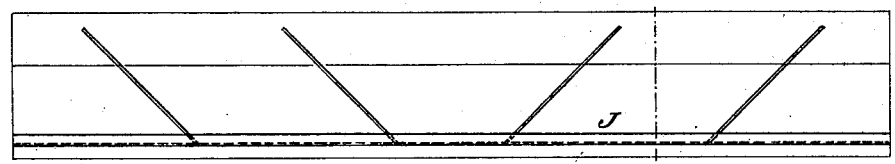 
Fig. 15   Fig. 16
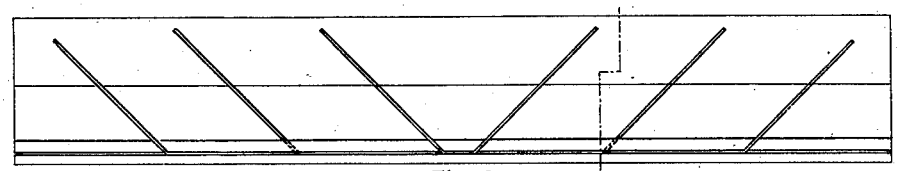 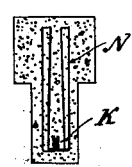
Fig. 17   Fig. 18
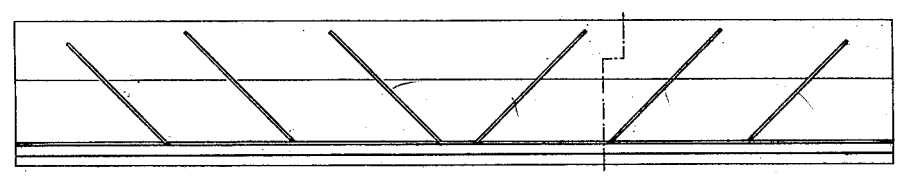 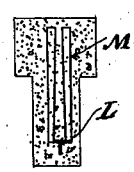
Fig. 19   Fig. 20
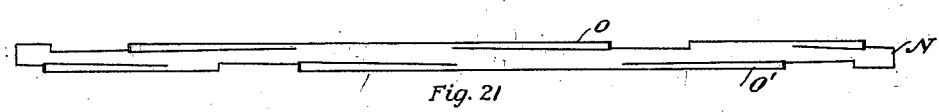
Fig. 21
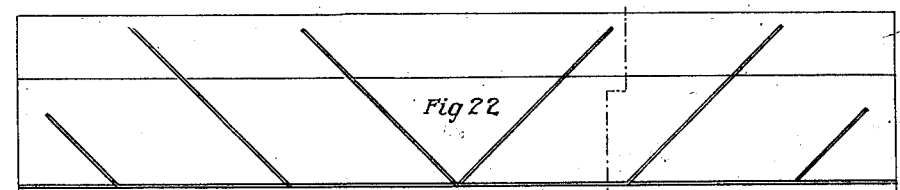 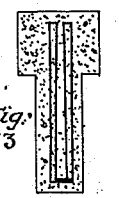
Fig. 22   Fig. 23
Witnesses: Julius Kahn
Inventor:
By his Attys.
THE NORRIS PETERS CO., PHOTO-LITHO., WASHINGTON, D. C.

No. 736,602. PATENTED AUG. 18, 1903.
J. KAHN.
CONCRETE AND METAL CONSTRUCTION.
APPLICATION FILED DEC. 11, 1902.
NO MODEL. 4 SHEETS—SHEET 3.
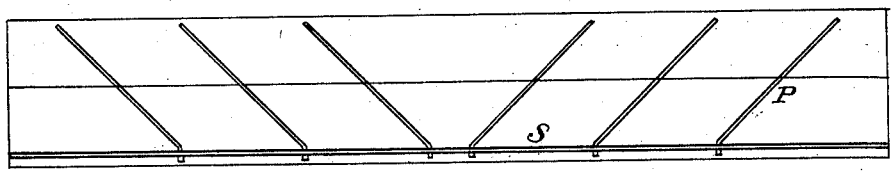
Fig. 24
Fig. 25
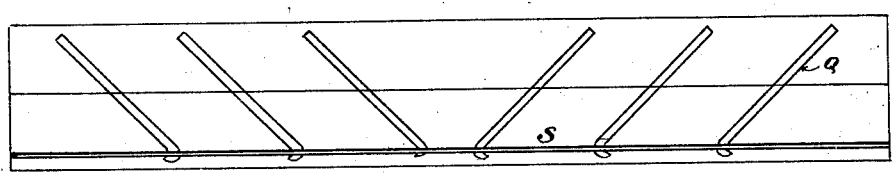
Fig. 26
Fig. 27
Fig. 28
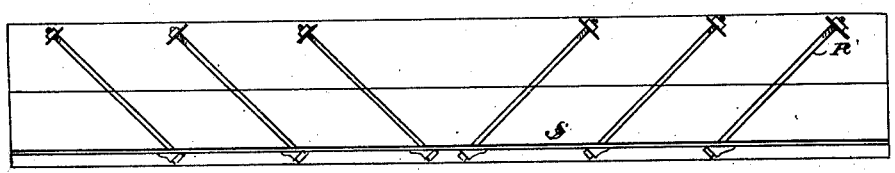
Fig. 29
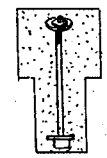
Fig. 30
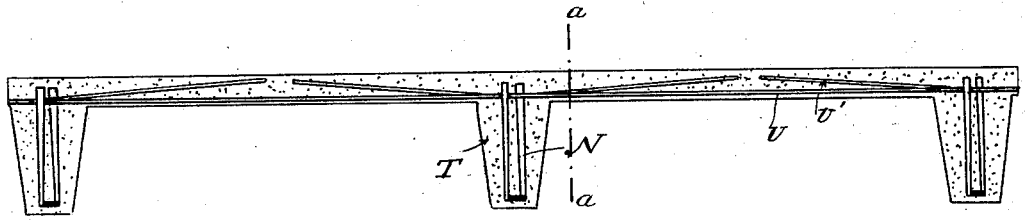
Fig. 31
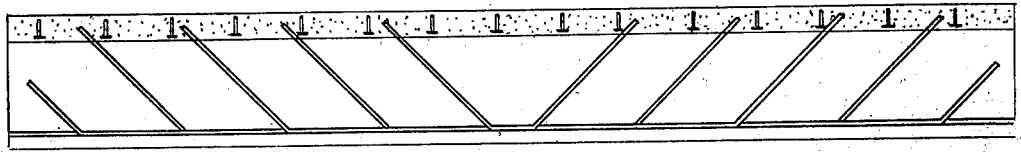
Fig. 32   Section a-a
Witnesses:
Julius Kahn
Inventor No. 736,602. PATENTED AUG. 18, 1903.
J. KAHN.
CONCRETE AND METAL CONSTRUCTION.
APPLICATION FILED DEC. 11, 1902.
NO MODEL. 4 SHEETS—SHEET 4.

Witnesses:
Julius Kahn
Inventor

No. 736,602. Patented August 18, 1903.

UNITED STATES PATENT OFFICE.

JULIUS KAHN, OF DETROIT, MICHIGAN.

CONCRETE AND METAL CONSTRUCTION.

SPECIFICATION forming part of Letters Patent No. 736,602, dated August 18, 1903.

Application filed December 11, 1902. Serial No. 134,804. (No model.)

*To all whom it may concern:*

Be it known that I, JULIUS KAHN, a citizen of the United States, residing at Detroit, in the county of Wayne and State of Michigan, have invented certain new and useful Improvements in Composite Concrete and Metal Constructions, of which the following is a specification, reference being had therein to the accompanying drawings.

My invention relates to composite concrete and metal constructions, and has for the primary object the obtaining of a trussed construction in which a portion of the trussed members are formed by metal and the remaining portion by concrete or cement.

It is a further object to so construct and arrange the metallic members within the body of cement that a plurality of minor members are rigidly secured at one end to a main member, whereby the stresses developed within the former are directly carried into the latter.

The invention consists in the peculiar construction of metallic members and their arrangement in relation to the body of the cement, and, further, in the construction in which the minor and main metallic members are formed from an integral blank or structural shape, and, further, in a peculiar construction and arrangement and combination of parts, as more fully hereinafter described in claims.

In the drawings I have illustrated diagrammatically various modifications of my invention, the metallic members being shown in elevation and the outline of the body being also indicated in full lines.

Figure 41:
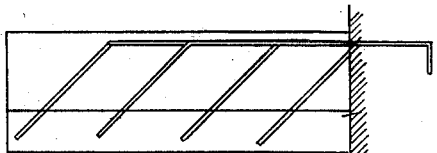
Figure 39:
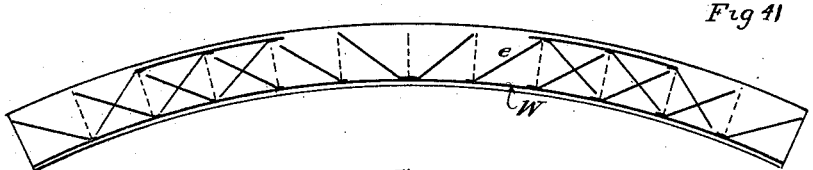
Figure 42:
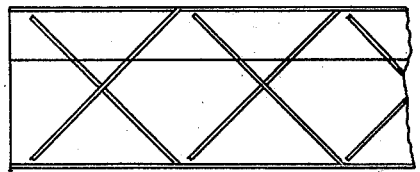
Figure 43:
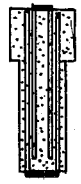
Figure 40:
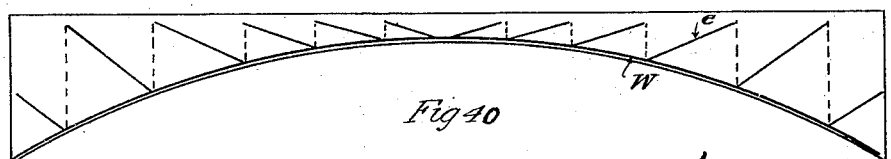

Figures 1, 2, and 3 are respectively a plan, side elevation, and cross-section of the beam employing my invention. Fig. 4 is a perspective view of a metallic strengthening member employed. Fig. 5 shows the inclined bars sloping opposite from those in Fig. 2. Figs. 6, 7, 10, 13, 15, 17, 19, 22, 24, 26, 29, 33, 35, 36, and 38 are elevations similar to Fig. 2, illustrating various modifications. Figs. 9, 11, 14, 16, 18, 20, 23, 25, 27, 30, 34, and 37 are cross-sections similar to Fig. 3 respectively through adjacent elevations. Figs. 8 and 28 are perspective views of modified constructions of metallic members. Fig. 12 is a plan view of the adjacent elevation 13, and Fig. 21 is a plan of the struck-up bar in Fig. 22. Figs. 31 and 32 illustrate a floor construction embodying my invention; Figs. 39 and 40, arches. Fig. 41 is an elevation showing an overhanging ledge. Fig. 42 is an elevation showing a construction in which the longitudinal members are not embedded in the cement body, but lie adjacent thereto; and Fig. 43 is a cross-section thereof.

A common feature of all the various modifications above referred to is that a main metallic member is connected to a plurality of supplemental metallic members and the latter being attached to one end to the main member and extending obliquely therefrom into the cementitious body. Furthermore, in all of the arrangements shown the main members correspond to the chords of a truss and the minor members to the web. The intention of the invention is to so place the metal within the concrete that each is stressed in the manner most advantageous to its special nature.

In Figs. 1 to 4 the metal is arranged to correspond to the tension members in the ordinary Pratt truss. A designates the body, of concrete or other cementitious rectangular form and is adapted for use as a beam. B is the metallic strengthening member, which is formed of a flat bar of metal having a plurality of portions $a$ thereof struck up centrally from the bar into an inclined position. As shown in Fig. 4, these inclined portions $a$ are preferably of varying size, the end members $a'$ being of the greatest length and the middle members $a^2$ being the shortest. The main member B is arranged adjacent to the lower edge of the body, but slightly embedded therein, and the minor members $a$ incline upward oppositely upon opposite sides of the center of the beam. The effect of this arrangement in the completed beam is that the tensile stresses developed in the minor members $a$ are communicated to the main member B directly, while the compression stresses intermediate said members $a$ are resisted by the concrete through the lines shown dotted. Where main metallic members are entirely distinct from each other, (see Fig. 33,) they are in the same manner held together through the concrete which grips the projecting web members. In Fig. 33 is shown how a metallic truss is thus completed, the concrete performing the same function as the web in a plate or latticed girder. With this arrangement it is not even necessary that the main members lie within the concrete at all, as their strain depends largely on the pull brought into them by the inclined members.

In Fig. 5 the main bar B is substantially the same as in Fig. 2, with the exception that web-bars incline in the opposite direction.

In Figs. 6, 7, 8, and 9 is shown a construction which may be used as a column in which the metallic strengthening members are arranged adjacent to each of the sides of the body. Each of these metallic members is formed from a flat bar having portions *b* struck up therefrom, but from the side of the bar instead of the center portion thereof.

In Figs. 10 and 11 metallic members are employed in which the main member E has riveted thereto the inclined auxiliary members F.

Figs. 12, 13, and 14 illustrate a construction in which an I-beam G has portion H of the web thereof struck up to form the inclined auxiliary members.

In Figs. 15, 16, 17, 18, 19, and 20 are respectively arranged the channel-beam J, a pair of angle-beams K, and a T-beam L, each of which have portions M struck up from the webs thereof to form the inclined auxiliary members.

In Fig. 21 there is shown a strengthening member formed from a flat bar N with the auxiliary members O and O' alternately struck up from the opposite sides of the bar.

In Figs. 24, 25, 26, 27, 28, 29, and 30 the auxiliary members P, Q, and R have a hooked or headed engagement with the main members S.

Figs. 31 and 32 show a monolithic floor and beam construction in which the beams or girders T are strenghtened by the metallic members N, while the floor slabs are strengthened by cord members U and inclined auxiliary members U', attached thereto at opposite ends and inclined upwardly.

Figure 34:
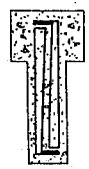
Figure 35:
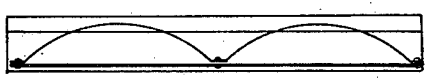
Figure 36:
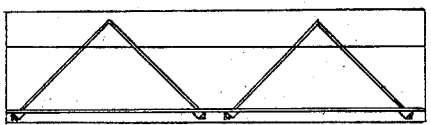
Figure 37:
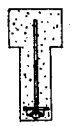
Figure 38:
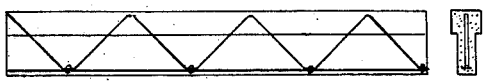

In Figs. 33 and 34 two main metallic members V and V' are arranged, respectively, adjacent to the lower and upper edges of the body. These members have auxiliary members *c* and *d* struck up therefrom but oppositely inclined, so as to form, in effect, a lattice-web within the body.

Although only several arrangements of webbed bars are shown here, it is understood that I may wish to use other methods of cutting the web-bars and bolting or riveting the same to the main members, holding, however, to the essential part of the claims, that the web members be secured to the main members, thereby forming the part truss, which is completed in its functions by the property of the concrete.

Figs. 35 to 38 show improved constructions in which the auxiliary members are secured at their opposite ends to the main member.

In Figs. 39 and 40 the main member W is arched to form a compression member, and the auxiliary members *e* extend from said inner member in the cementitious body at various angles.

From the description and illustration given it will be understood that the underlying idea in my invention consists, essentially, in providing a main metallic strengthening member with a plurality of auxiliary members, said auxiliary members being rigidly attached to the main member, so as to transmit the stresses developed therein cumulatively into said main member.

What I claim as my invention is—

1. The combination with a cementitious body of a metallic strengthening member therefor, extending longitudinally thereof, and a plurality of uprightly-extending members, rigidly attached to said longitudinal metallic member, at points intermediate the ends of the latter and projecting obliquely therefrom to form the diagonal members only of a part of a truss, said laterally-extending members being embedded in said cementitious body whereby the stresses are communicated from said latter longitudinally into said main member.

2. The combination with a cementitious body of a metallic member comprising a longitudinally-extending bar and a plurality of laterally-inclined arms, struck up from said metallic member and forming a portion of a truss of which the remaining constituents are formed by the cementitious body.

3. The combination with a cementitious body of metallic members extending longitudinally and on opposite sides of said body; said main metallic members being provided with inclined laterally-extending arms or auxiliary members rigidly secured thereto intermediate their ends and adapted when set in a cementitious body to form substantially a latticed column, main members being united only through the adhesion of the cement.

4. A combination with a cementitious body of a plurality of metallic members arranged to extend longitudinally adjacent to opposite sides of the body, each member being provided with obliquely-extending arms or auxiliary members corresponding to the diagonal members only of a truss, and rigidly secured thereto intermediate its ends, the auxiliary members on the two main members being oppositely inclined to cross each other and depending upon the adhesion of the cementitious body to unite them and to form substantially a latticed girder.

5. The combination with a cementitious body of a plurality of metallic members arranged to extend longitudinally adjacent to opposite sides of said body, each member being provided with obliquely-extending arms or auxiliary members struck up from the same and intermediate its ends, the auxiliary members and the two main members being oppositely inclined to cross each other, and depending on the adhesion of the cementitious body to both to unite them, and to form substantially a latticed girder.

6. The combination with a cementitious body of a metallic strengthening member therefor, comprising a longitudinally-extending main portion and an obliquely-inclined auxiliary portion struck up from said main portion intermediate its ends, and extending into the cementitious body for the purpose of transmitting stresses thereto.

7. The combination with a cementitious body of a metallic strengthening-body therefor, comprising a longitudinally-extending member of structural shape having intermediate portions thereof struck up to form a portion of a truss of which the remaining constituents are formed by the cementitious body.

In testimony whereof I affix my signature in presence of two witnesses.

JULIUS KAHN.

Witnesses:
M. B. O'DOGHERTY,
A. G. ROBERTSON.